United States Patent

Cook et al.

[15] 3,641,558

[45] Feb. 8, 1972

[54] MULTIPLEXED VIDEO GENERATION

[72] Inventors: William C. Cook, Rockville; Walter J. Hogan, Silver Spring, both of Md.

[73] Assignee: International Business Machines Corporation, Armonk, N.Y.

[22] Filed: Nov. 21, 1969

[21] Appl. No.: 878,711

[52] U.S. Cl. ........................................340/324 A, 340/172.5

[51] Int. Cl. ........................................G06f 3/14

[58] Field of Search.................340/324 A, 172.5; 178/50, 52

[56] References Cited

UNITED STATES PATENTS

| | | | |
|---|---|---|---|
| 3,555,520 | 1/1971 | Helbig et al. | 340/324 |
| 3,179,883 | 4/1965 | Farrow | 340/324 |
| 2,345,458 | 10/1967 | Cole et al. | 340/324 |
| 3,426,344 | 2/1969 | Clark | 340/324 |
| 3,503,063 | 3/1970 | Starr | 340/324 |

*Primary Examiner*—John W. Caldwell
*Assistant Examiner*—Marshall M. Curtis
*Attorney*—Hanifin and Jancin and George E. Clark

[57] ABSTRACT

The number of sequential line buffers in a digital TV system including a symbol generator which consists of a group of segment generators is reduced by connecting in series a group of sequential line buffers. Each sequential line buffer is a shift register which contains the number of character positions representing one horizontal row of characters. For a 10-line-high character with six lines of vertical spacing between rows of characters, five segment generators and five sequential line buffers are used to achieve maximum hardware efficiency.

5 Claims, 12 Drawing Figures

INVENTORS
WILLIAM C. COOK
WALTER J. HOGAN

BY George E. Clark
AGENT

| | | LINE COUNT 1 | 2 | 3 | 4 | 5 | 6 | 7 | 8 |
|---|---|---|---|---|---|---|---|---|---|
| PCG 1 | GR 1 | 1 | 2 | 3 | 4 | 5 | 6 | 7 | 8 |
| | 2 | 9 | 10 | 11 | 12 | 13 | 14 | 15 | 16 |
| | 3 | 17 | 18 | 19 | 20 | 21 | 22 | 23 | 24 |
| | 4 | 25 | 26 | 27 | 28 | 29 | 30 | 31 | 32 |
| PCG 2 | GR 1 | 8 | 1 | 2 | 3 | 4 | 5 | 6 | 7 |
| | 2 | 16 | 9 | 10 | 11 | 12 | 13 | 14 | 15 |
| | 3 | 24 | 17 | 18 | 19 | 20 | 21 | 22 | 23 |
| | 4 | 32 | 25 | 26 | 27 | 28 | 29 | 30 | 31 |
| PCG 3 | GR 1 | 7 | 8 | 1 | 2 | 3 | 4 | 5 | 6 |
| | 2 | 15 | 16 | 9 | 10 | 11 | 12 | 13 | 14 |
| | 3 | 23 | 24 | 17 | 18 | 19 | 20 | 21 | 22 |
| | 4 | 31 | 32 | 25 | 26 | 27 | 28 | 29 | 30 |
| PCG 4 | GR 1 | 6 | 7 | 8 | 1 | 2 | 3 | 4 | 5 |
| | 2 | 14 | 15 | 16 | 9 | 10 | 11 | 12 | 13 |
| | 3 | 22 | 23 | 24 | 17 | 18 | 19 | 20 | 21 |
| | 4 | 30 | 31 | 32 | 25 | 26 | 27 | 28 | 29 |
| PCG 5 | GR 1 | 5 | 6 | 7 | 8 | 1 | 2 | 3 | 4 |
| | 2 | 13 | 14 | 15 | 16 | 9 | 10 | 11 | 12 |
| | 3 | 21 | 22 | 23 | 24 | 17 | 18 | 19 | 20 |
| | 4 | 29 | 30 | 31 | 32 | 25 | 26 | 27 | 28 |

MULTIPLEX VIDEO GENERATOR

FIG. 11

HEXADECIMAL REPRESENTATION OF VIDEO DATA-ROW 1 ODD

| | 1 | 2 | 3 | 4 | 5 | 6 | 7 | 8 | 1 | 2 | 3 | 4 | 5 |
|---|---|---|---|---|---|---|---|---|---|---|---|---|---|
| PCG 1 | 18 | 18 | 18 | 18 | 18 | 18 | 18 | 18 | FC | | | | |
| 2 | | 7E | 7E | 7E | 7E | 7E | 7E | 7E | 7E | C7 | | | |
| 3 | | | C3 | C3 | C3 | C3 | C3 | C3 | C3 | C3 | FE | | |
| 4 | | | | FF | FF | FF | FF | FF | FF | FF | FF | C7 | |
| 5 | | | | | C3 | C3 | C3 | C3 | C3 | C3 | C3 | C3 | FE |

HEXADECIMAL REPRESENTATION OF VIDEO DATA-ROW 1 EVEN

| | | | | | | | | | | | | | |
|---|---|---|---|---|---|---|---|---|---|---|---|---|---|
| PCG 1 | 3C | 3C | 3C | 3C | 3C | 3C | 3C | 3C | FE | | | | |
| 2 | | E7 | E7 | E7 | E7 | E7 | E7 | E7 | E7 | C7 | | | |
| 3 | | | FF | FF | FF | FF | FF | FF | FF | FF | FE | | |
| 4 | | | | C3 | C3 | C3 | C3 | C3 | C3 | C3 | C3 | C7 | |
| 5 | | | | | C3 | C3 | C3 | C3 | C3 | C3 | C3 | C3 | FC |

MULTIPLEXED VIDEO GENERATION

CROSS-REFERENCE TO RELATED APPLICATIONS

1. Multiplex Character Generator, A. E. Malden, Ser. No 878,713, filed Nov. 21, 1969.

2. Staggered Video Digital TV System, W. J. Hogan, et al. Ser. No 878,712, filed Nov. 21, 1969.

BACKGROUND OF THE INVENTION

This invention relates to computer connected input/output systems and more particularly to systems for generating symbols for display on display devices in response to information signals from a central processor unit.

In the prior art, symbol generators have been described in which a group of display devices received inputs from a corresponding group of synchronous refresh storage devices such a delays lines or rotating magnetic disks. These synchronous storage devices received as inputs a stream of video information generated by a corresponding group of character generators wherein each character generator generated the complete character for one or possibly two display devices. The inputs to this group of character generators was in the form of parallel digital information usually from some form of temporary storage.

Systems of this nature require many character generators and many synchronous storage elements to generate information for presentation on a large cluster of display devices. Due to limitations of cost and size, systems of this nature were usually limited to a maximum of eight display devices per control unit.

Accordingly, it is an object of this invention to reduce the number of line buffers, segment generators and multiplex gates required to generate symbols for a large cluster of input/output devices.

It is a further object of this invention to reduce the number of line buffers, segment generators and multiplex gates according to the formula:

$$N\ M\ S/F$$

where $N$ is equal to the number of segment generators and sequential line buffers required.

$M$ is equal to the number of lines per symbol block.

$S$ is equal to the number of line spaces between rows of symbols.

$F$ is equal to the numbe=of-fields per frame in a scanned raster.

SUMMARY OF THE INVENTION

Accordingly, the invention comprises method and apparatus for efficiently operating a segmented character generator.

During video line time 1, the row of symbols to be displayed on terminal 1 is contained in line buffer 1 and parallel to serial converter 1 provides the output video for terminal 1. During video line time 2, the row of symbols to be displayed on terminal 1 is contained in line buffer 2 of parallel to serial converter 2 provides the output video for terminal 1. Also, the row of symbols to be displayed on terminal 2 is contained in line buffer 1 and parallel to serial converter 1 provides the output video for terminal 2.

This operation is continuous with the video to be displayed on a given terminal being shifted down through the sequential line buffers and the parallel to serial converters providing output video to the different terminals in s sequential manner. As the data for each terminal is shifted through the last line buffer, the last line segment of the symbol line for that terminal is generated. For the next S lines, a blank signal is transmitted to the terminal after which the process described above is repeated.

The above technique allows the use of $N-1$ sequential line buffers and N segment generator and parallel to serial converters to generate the video for a cluster of 32 display terminals.

The various features of the invention and details of operate are defined with particularity in the following specification.

BRIEF DESCRIPTION OF THE DRAWINGS

FIG. 11 shows a hexidecimal representation of the video data for a row of characters on the odd and even scan, showing the data that is being generated by each of the segment generators at any instant of time; the first eight symbols generated are the letter A the ninth symbol generated is the letter B. This corresponds to the illustration shown in FIG. 1.

DETAILED DESCRIPTION OF THE INVENTION

System Environment

Figure 2:
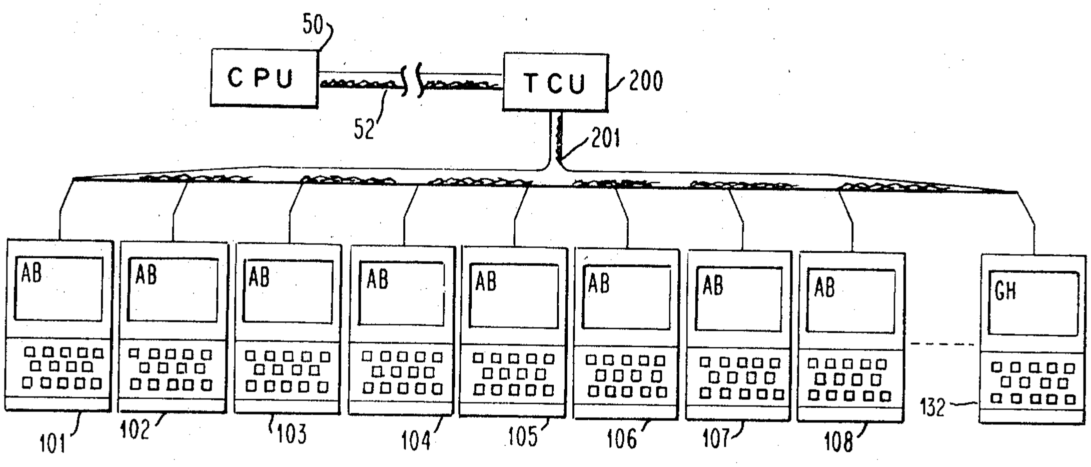
FIG. 2 is a block diagram showing a systems environment embodying the invention.

Referring now to FIG. 2, a group of display terminals 101 through 132 are connected to a terminal control unit (TCU) 200 by lines 201. TCU 200 communicates with central processing unit (CPU) 50 by lines 52. For illustrative purposes the symbols A and B are shown to be the first two symbols of the first row of characters on each of the first eight display terminals 101 through 108.

TERMINAL CONTROL UNIT

Figure 3:
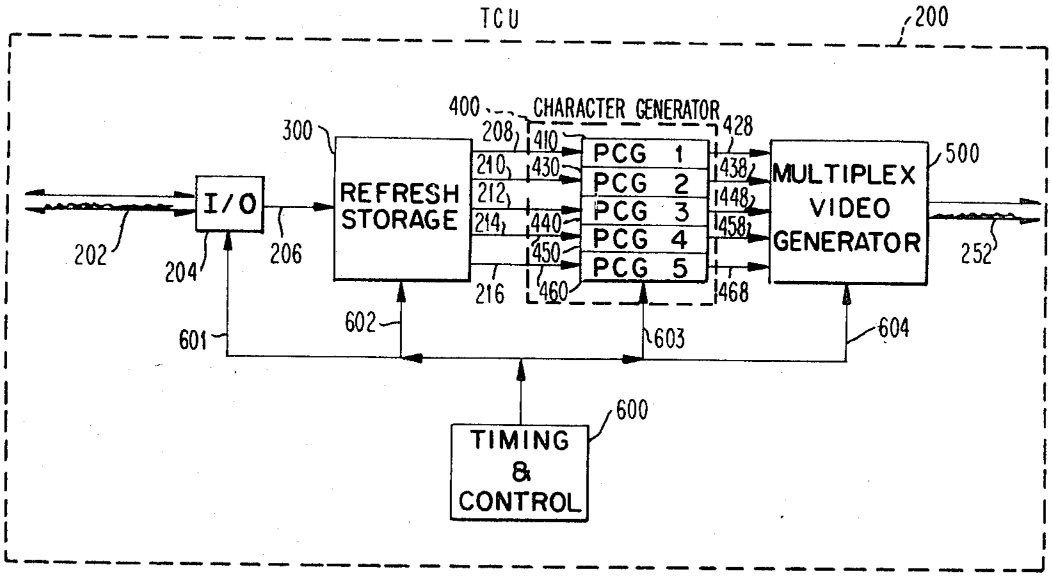
FIG. 3 is a block diagram of a terminal control unit embodying the invention.

Referring now to FIG. 3, TCU 200 is shown in block diagram form. Incoming information is presented to I/O unit 204 on lines 202. I/O unit 204 then transfers in parallel the appropriate signals to refresh storage 300 on lines 206. Refresh storage 300 has a plurality of output lines 208, 210, 212, 214 and 216 which are connected respectively to segment generators PCG1 410 PCG2 430, PCG3 440, PCG4 450 and PCG5 460. The data transferred between refresh storage 300 and character generator 400 along each of the lines mentioned is in parallel byte form. The segmented character generator has a plurality of output lines, one group of lines in parallel from each of the five segment generators. PCG1 is connected to multiplex generator 500 by line 428, PCG2 by line 438, PGC3 by line 448, PCG4 by line 458 and PCG5 by line 468. Multiplex video generator 500 accepts the video signals from said segmented character generator 400 and synchronization signals from timing & control unit 600 and generates appropriate video-scanning signals which are distributed to the plurality of display terminals by lines 252. Timing and control unit 600 is connected to I/O unit 204 by lines 601, to refresh storage 300 by lines 602, to segmented character generator 400 by lines 603 and to multiplex video generator 500 by lines 604.

REFRESH STORAGE

Figure 4:
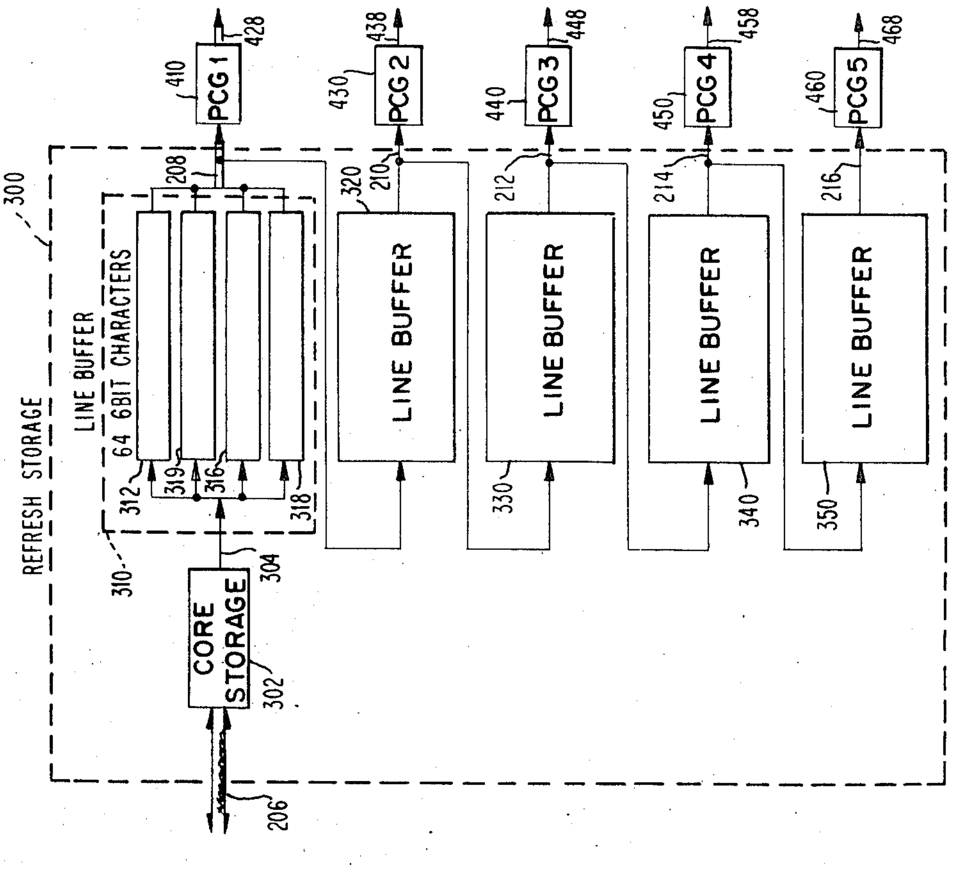
FIG. 4 is a block diagram illustrating a segmented character generator with a refresh storage connected to the inputs of the various segment generators.

Referring now to FIG. 4, refresh storage 300 has two major sections. Information bytes in binary form are presented to core storage 302 by line 206 which connects the I/O unit 204 (see also FIG. 3) to the refresh storage 300. Core storage 302 stores command and data information in parallel in byte form for transmission to a group of line buffers. Core storage 302 is connected to the first line buffer 310 by lines 304. In an exemplary embodiment line buffer 310 contains four parallel, six-bit, 64-character buffers 312, 319, 316 and 318. Four parallel buffers allow simultaneous generation of video symbols for four times as many display terminals as if a single six-bit, 64-character buffer were used. Line buffers 320, 330, 340 and 350 are identical to line buffer 310. The outputs of line buffer 310 are connected to the inputs of segment generator PCG1 410 and also to the inputs of line buffer 320. In like manner, the outputs of line buffer 320 are connected by lines 210 to the inputs of segment generator 430 and to the inputs of line buffer 330. The outputs of line buffer 330 are connected by lines 212 to the inputs of segment generator 440 and to the inputs of line buffer 340. The outputs of line buffer 340 are connected by lines 214 to three inputs of segment generator 450 and to the inputs of line buffer 350. The outputs of line buffer 350 are connected by lines 216 to segment generator 460. It can be seen that in like manner, if the number of segment generators PCG*n* are increased, the number of line buffers can also be increased to adapt the system to any font of symbols desired.

Segmented Symbol Generator

Figure 5:
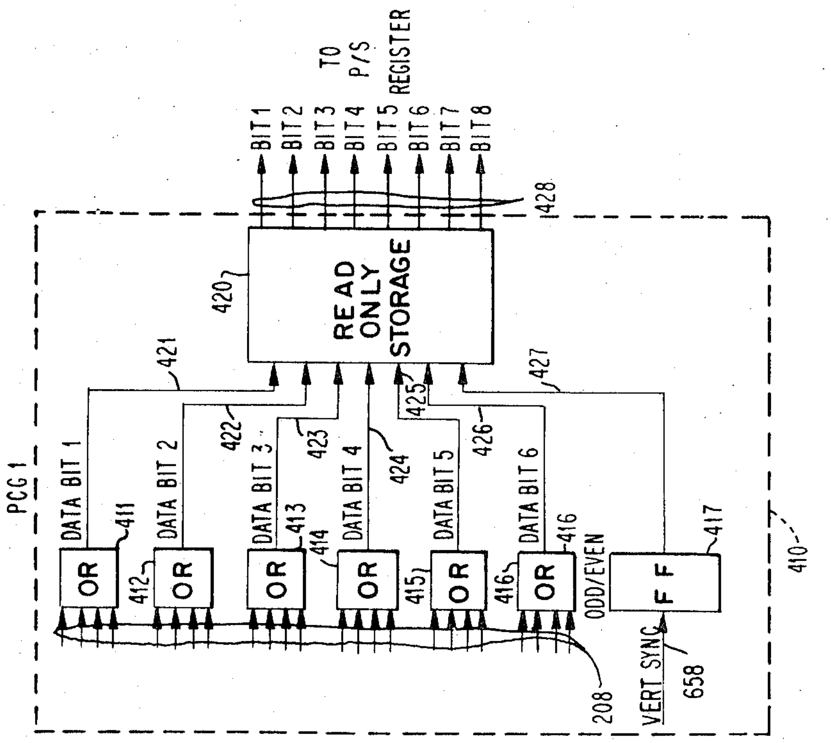
FIG. 5 shows a block diagram which illustrates an embodiment of a single segment generator.

Referring now to FIG 5, an exemplary segment generator 410 is shown. Lines 208 which are the outputs of the four buffers which make up line buffer 310 (see also FIG. 4) are connected to a plurality of OR-circuits 411, 412, 413, 414, 415, and 416. The output 421 of OR-circuit 411 represents symbol data bit 1. The output 422 of OR-circuit 412 represents symbol data bit 2. The output 423 of OR-circuit 413 represents symbol data bit 3. The output 424 of OR-circuit 414 represents symbol data bit 4. The output 425 of OR-circuit 415 represents symbol data bit 5 and the output 426 of OR-circuit 416 represents symbol data bit 6. It can be seen also that a number of data bits used to encode the symbol information could be either contracted or expanded depending upon the specific group of symbols involve. For example, an eight-bit code could be used wherein additional OR circuits and inputs to read-only storage 420 would be necessary.

The odd/even signal is presented to read-only storage 420 on line 427. This signal is generated by flip-flop 417 which has as its input the vertical synchronization signal which appears on line 658.

Read-only storage 420 accepts as its input a data byte representative of a particular symbol to be generated. The output lines 428 of read-only storage 420 represent a single horizontal line segment of the symbol to be generated, which in the exemplary case is an eight-bit parallel byte.

Figure 6:
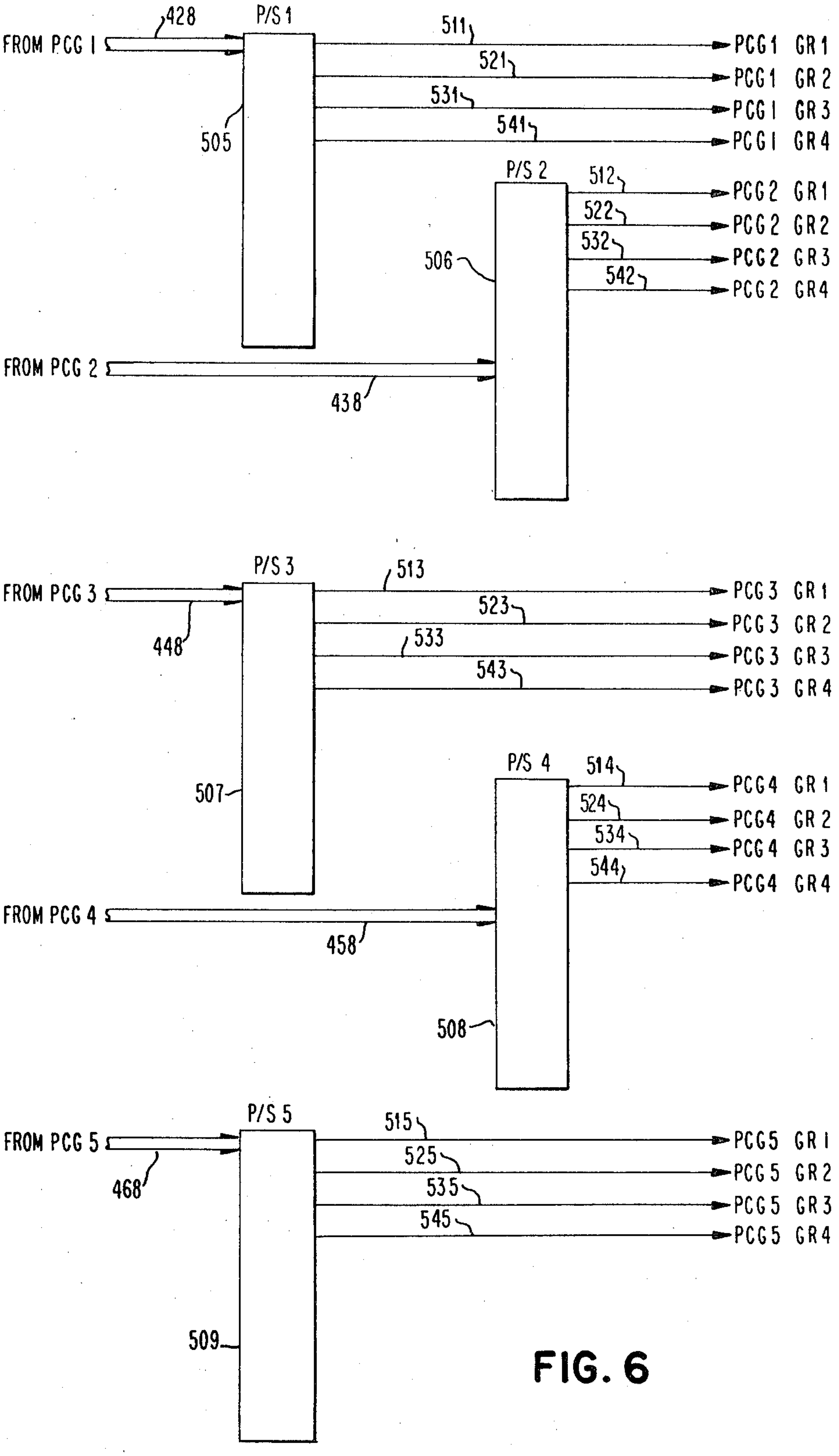
FIG. 6 is a block diagram showing the connections between the segmented character generator and a group of parallel to serial registers.

Read-only storage output lines 428 from PCG1 are connected to parallel-to-serial register P/S 1 505 (see FIG. 6). In like manner, the outputs 438 (see also FIG. 4), 448, 458, and 468 from segment generators 430, 440, 450, and 460 respectively, are connected to P/S 2 506, P/S 3 507, P/S 4 508, and P/S 5 509, respectively.

Figure 6A:
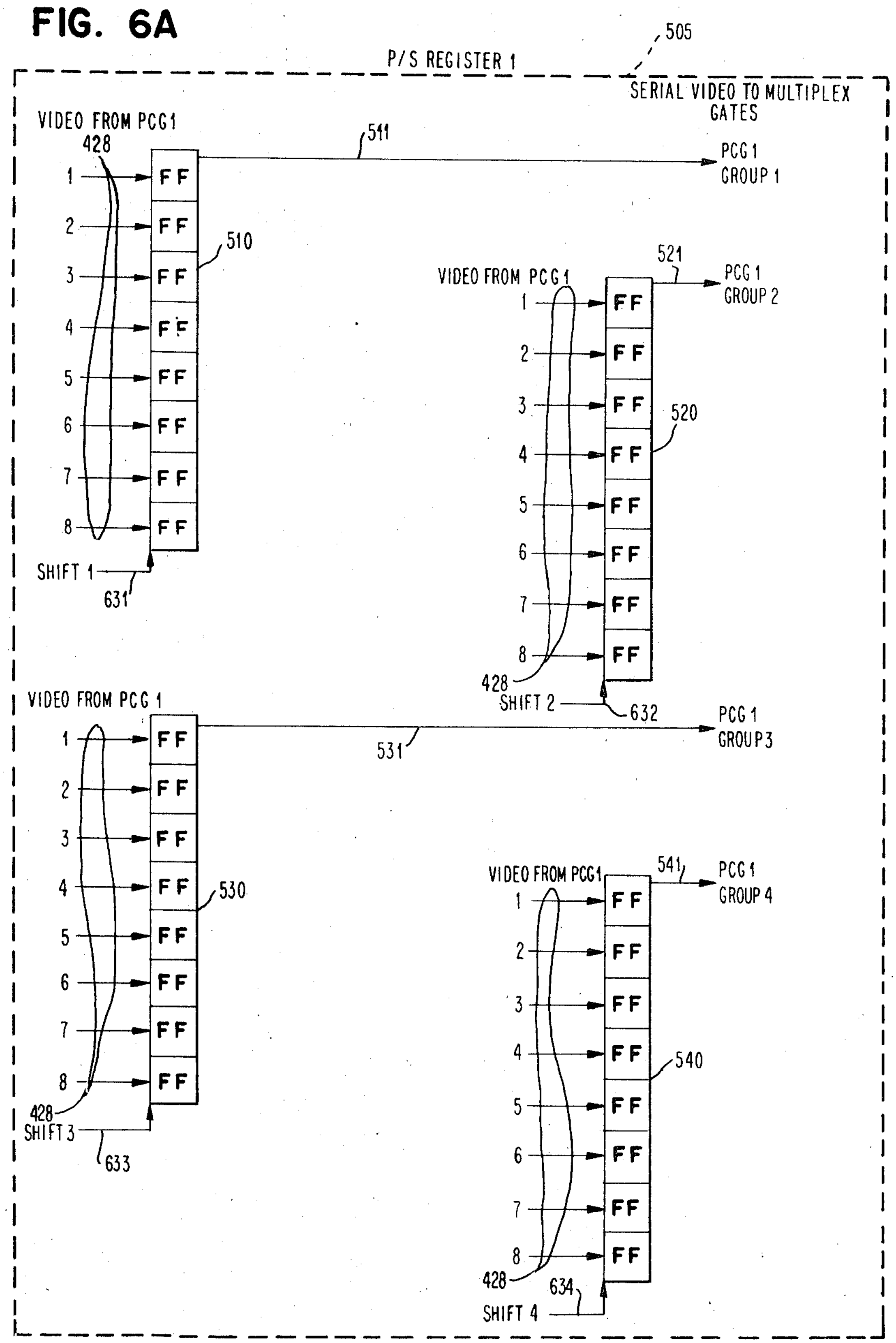
FIG. 6A shows in more detail the construction of a representative parallel to serial register.
Figure 7:
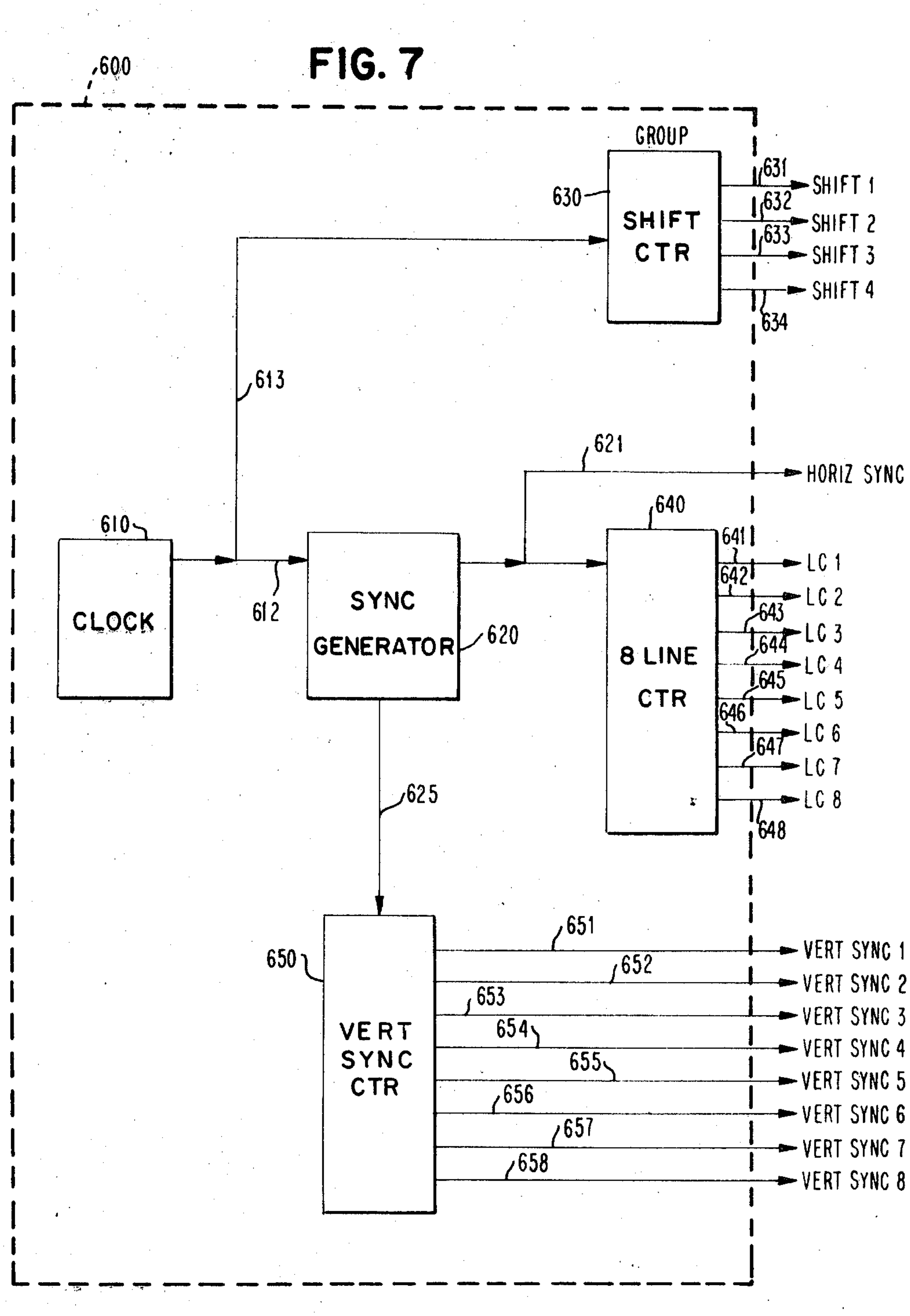
FIG. 7 is a block diagram showing the generation of the various synchronization and control signals necessary for the operation of the multiplexed character generator.
Figure 10:
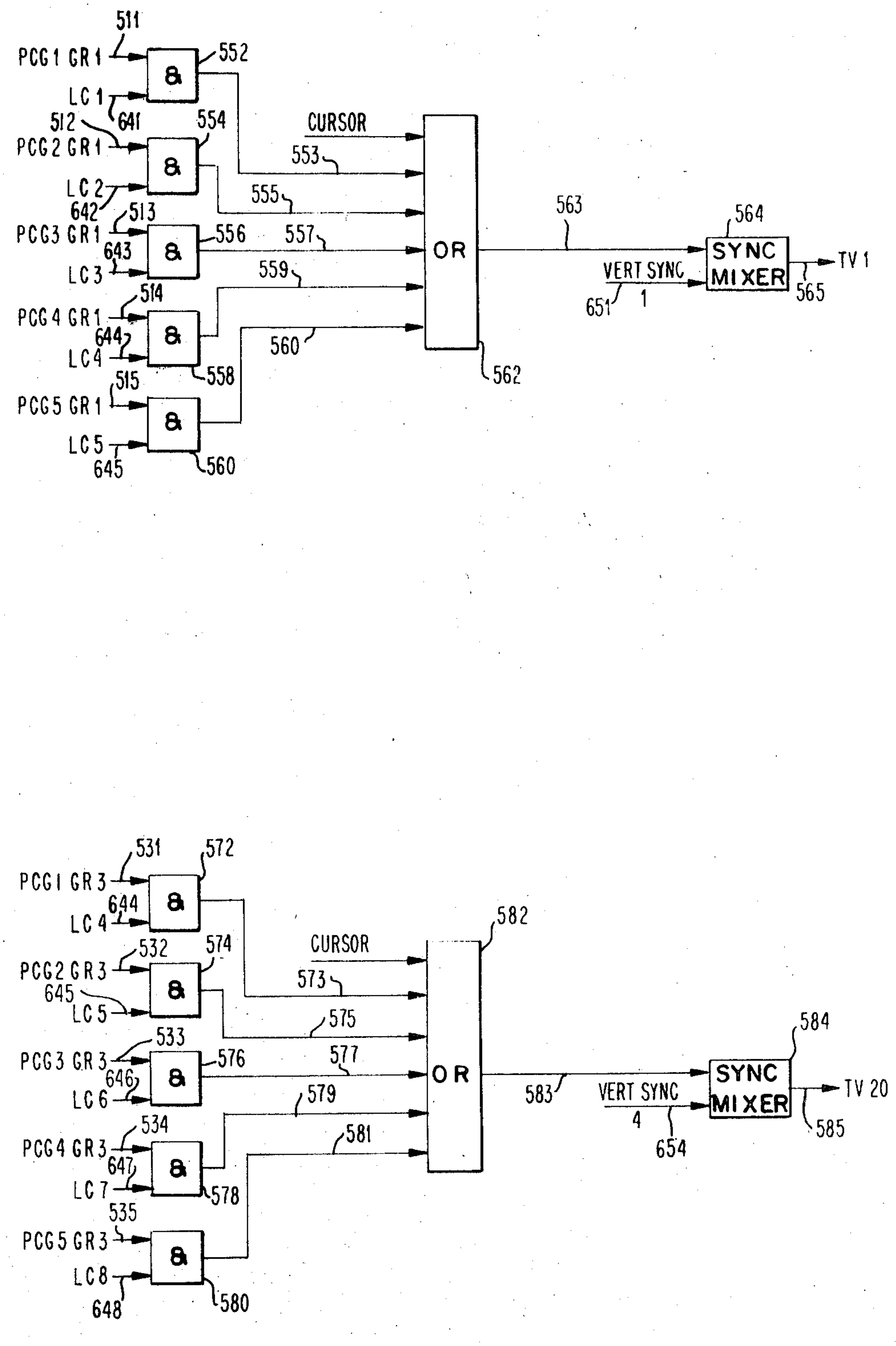
FIG. 10 shows the gating circuits which perform the multiplexing of the signals shown in the chart of FIG. 9 to generate the video signals for representative video terminals No 1 and No. 20.

Referring now to FIG. 6A, an exemplary P/S register is shown. Register P/S 1 505 contains four *n*-bit shift registers where *n* is equal to the number of bits in the data byte from the read-only storage elements. Since in the preferred embodiment being described, 32 display terminals are being controlled by one terminal control unit, four distinct shift lines are necessary which correspond to the four distinct buffers in each of the line buffers 310, 320, 330, 340, and 350 (see also FIG. 4). Line 428 is connected in parallel to *n*-bit shift registers 510, 520, 530, and 540. Referring also to FIG. 7, group shift lines are generated in group shift counter 630 which is connected to basic clock 610 by lines 613. Line shift 1 631 is connected to shift input of shift register 510 (see FIG. 6A). Line shift 2 is connected to shift register 520 on line 632. Line shift 3 is connected to shift register 530 on line 633. Line shift 4 is connected to shift register 540 on line 634. The serial outputs from the shift registers are presented to the multiplexed video gates, an example of which is shown in FIG. 10 as AND-circuits 552, 554, 556, 558, 560, 572, 574, 576, 578 and 580.

MULTIPLEXED VIDEO GENERATOR

Referring to FIGS. 6, 6A, 9 and 10, the multiplexed data connections necessary to generate the video signals for representative terminals 1 and 20 of a group of 32 terminals are shown.

Figures 8, 9:
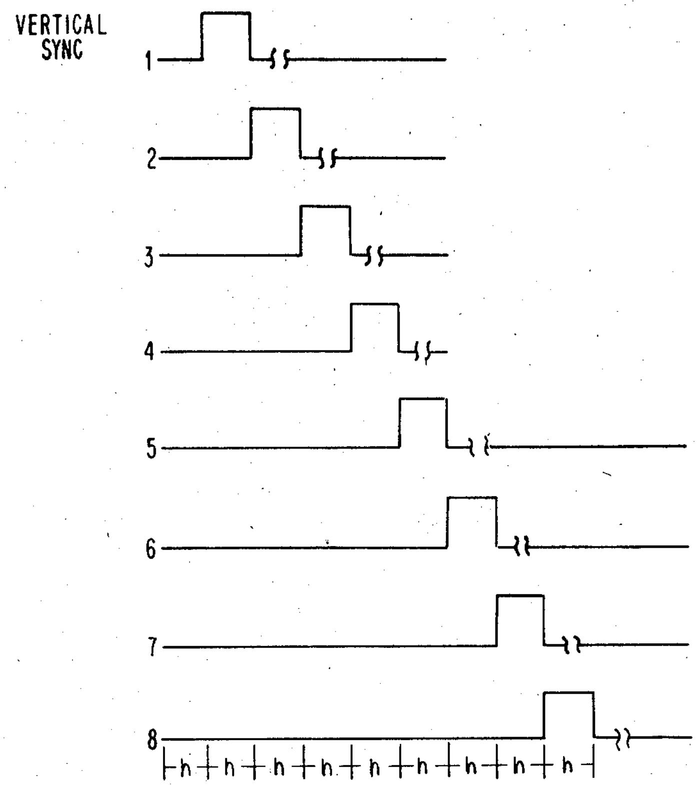
FIG. 8 is a timing diagram showing the relationship between the vertical synchronization signals used to drive the group of display terminals.
FIG. 9 is a chart illustrating how the video signals for display terminal No. 1 and display terminal No. 20 are multiplexed.

In order to generate the correct video signals for display terminal 1, it can be seen from FIG. 9 that at line count 1 time the segment generator output PCG1GR1 (see also FIG. 6) must be gated to the video line, and at line count 2 PCG2GR1 must be gated to the video line. In like manner PCG3GR1 at line count 3, PCG4GR1 at line count 4, and PCG5GR1 at line count 5 must be gated to the video line for each field of data to achieve a complete horizontal line row of symbols for display terminal 1.

In like manner, to generate the video signals for display terminal 20, at line count 4, segment generator PCG1GR3 is gated; and at line count, 5 PCG2GR3 is gated; at line count 6 PCG3GR3 is gated; at line count 7, PCG4GR3 is gated; and at line count, 8 PCG5GR3 is gated to the video line for display terminal 20.

The outputs from P/S registers 505, 506, 507, 508, 509, are presented to the multiplex video gates according to the chart shown in FIG. 9.

For display terminal 1, P/S register output 511 (see also FIG. 7) is connected to AND-circuit 552 (see also FIG. 10) as one input. Line 641 (see also FIG. 7) is connected from 8 line counter 640 to a second input of AND-circuit 552 (FIG. 10) such that the information presented on line 511 will be gated to OR-circuit 562 along output line 553 at count LC1. In like manner, output line 512 representing PCG2GR1 is connected to a first input to AND-circuit 554 while line 642 is connected from 8 line counter 640 to a second input of AND 554. The output 555 of AND-circuit 554 is connected to a second input of OR-circuit 562 and represents the second horizontal line in each field to be displayed on display terminal 1. Line 643 is connected to an input of AND-circuit 556 along with PCG3GR1 513. The output 557 of AND-circuit 556 is connected to a third input of OR-circuit 562 and represents the third horizontal line in each field for each row of symbols to be generated on display terminal 1. Line 644 is connected to an input of AND-circuit 558 as in PCG4GR1 514. The output 559 of AND-circuit 558 is connected to a fourth input to OR-circuit 562 and represents the fourth line to be generated in each field of each row of symbols to be generated on display terminal 1. Line 645 is connected to an input of AND-circuit 560 while PCG5GR1 515 is connected to a second input of AND-circuit 560. The output 561 of AND-circuit 560 is connected to a fifth input of OR-circuit 562 to provide the fifth line of each field of each row of symbols to be generated on display terminal 1.

It is clear that if a different symbol set were used, the number of segment generators or the line count outputs could be increased or decreased to meet the requirements of a particular symbol set. In such a case the number of AND-circuits 552 through 560 would accordingly be increased or decreased as well as the number of inputs to OR-circuit 562.

The output 563 of OR-circuit 562 is connected to one input of sync mixer 564. The second input to sync mixer 564 is vertical sync 1 651 (see FIG. 7) which is generated by vertical sync counter 650.

Sync mixer 564 can be any one of a number of circuits known in the television art to add a synchronization signal to an information signal for proper display on a display terminal.

The output 565 of sync mixer 564 is then connected to the No. 1 display terminal 101 (FIG. 2). Referring to FIG. 9, it can be seen that the video signals for display terminals 1 through 8 are generated from the GR1 signals of segment generators PCG1, 2, 3, 4, and 5. GR2 provides a gating signal for the generation of the video signals for display terminals 9 through 16. GR3 provides the gating signals for the generation of video signals for display terminals 17 through 24 and GR4 generates the gating signal for the generation of video signals for display terminals 25 through 32.

Referring again to FIG. 10 and to FIG. 9, the video signals for display terminal 20 (not shown) is generated in AND-circuit 572 by line count 4 644 and PCG1GR3 531, in AND-circuit 574 by line count 5 645 and PCG2GR3 532, in AND-circuit 576 by line count 6 646 and PCG3, GR3 533, ANDing in AND-circuit 578 line count 7 647 and PCG4 GR3 534 and in AND-circuit 580 by line count 8 648 and PCG5 GR3 535. The outputs 573, 575, 577, 579, 581 of AND-circuits 572, 574, 576, 578, 580 respectively are connected to respective inputs of OR-circuit 562 along with a cursor input as in the circuitry for generating the video signals for No. 1 display terminal 101 (FIG. 2).

The cursor can be generated by any conventional means and is ORed into the video stream at AND-circuits 562 or 682. The output 583 of OR-circuit 582 is connected to sync mixer 584 which has as another input vertical sync 4 654 which is generated by vertical sync counter 650. Sync mixer 584 is an identical circuit to sync mixer 564 and circuits of this type are well known in the art. The output 585 of sync mixer 584 is connected to display terminal 20 120.

TIMING AND CONTROL

Referring now to FIGS. 7, 8 and 12, a clock signal generator 610 generates a basic timing signal which is used to generate all the necessary timing signals for the terminal control unit 200. The output of clock generator 610 is connected to sync generator 620 by line 612 and to group shift counter 630 by line 613. Sync generator 620 generates the horizontal synchronization signal which is presented on line 621 and a base vertical synchronization signal which is presented on line 625.

Sync generator 620 is connected to vertical sync counter 650 by line 625 and to eight-line counter 640 by line 621.

Eight-line counter 640 generates signal line count one through line count eight which are required for the multiplex video gating. Vertical sync counter 650 generates a series of $n$ vertical synchronization signals each of which is staggered in time by one horizontal time period. Vertical sync 1 through vertical sync 8 are presented on lines 651 through 658. The time displacement of the vertical synchronization signals is shown clearly in FIG. 8. Where $h$ is equal to 1 horizontal line time including trace and retrace.

The time displacement of vertical synchronization signals 2 through 8 allows the video signals for each of the 32 display terminals 101 (see FIG. 2) through 132 to begin at the same relative position on the face of the display device. Referring to FIG. 11, it can be seen that if the vertical synchronization signals were not displaced in time, at a first instant in time, a video signal would appear only on display terminals 1, 9, 17, and 25. At the beginning of a second horizontal line scan in each field, a video signal would appear in addition only on display terminals 2, 10, 18 and 26, on the third horizontal line scan display terminals 3, 11, 19 and 27 and so on with an additional four displays beginning with each successive horizontal line until all 32 displays are presenting symbols.

The staggering of the vertical synchronization signal allows the video signal for each of the 32 display terminals to begin the first horizontal line of each field at the same relative position on each display device.

Group shift counter 630 provides four shift signals shift 1, 631, shift 2, 632, shift 3, 633 and shift 4 634. These shift signals are presented to P/S registers to gate the video information for the proper display terminal to the multiplex gate at the correct time.

OPERATION

Referring now to FIGS. 2, 3, 4 and 5, the operation of a preferred embodiment of the invention will be described.

Information to be displayed is transmitted from CPU 50 (FIG. 2) to terminal control unit 200 along lines 52. Terminal control unit 200 the generates appropriate video signals for the various display terminals in response to the information from the CPU 50. These video signals are transmitted to display terminals 101 through 132 along lines 201.

Terminal control unit 200 receives the information from CPU 50 in I/O control 204 (FIG. 3) which performs all necessary interface communications with the CPU 50. The information is then transmitted to refresh storage 300 and stored in core storage 302. At the appropriate time under the control of timing and control element 600 (FIG. 3), information bytes representing symbols to be displayed are transmitted to a first line buffer 310. Line buffer 310 acts as a buffer between core storage 302 and the first segment generator PCG1 410. Line buffer 310 is not necessary in applications where the operating speed of the core storage and the segment generator are comparable. Segment generator 410 generates the first scan line of a symbol in each row of symbols on the odd horizontal scans and the second line of a symbol in each row of symbols on the even horizontal scans in response to the information byte from line buffer 310.

Each of the line buffers 310, 320, 330, 340 and 350 provides a delay of one horizontal line scan time so that the output signals from line buffer 310 to line buffer 320, from line buffer 320 to line buffer 330, from line buffer 330 to line buffer 340 and from line buffer 340 to line buffer 350 begin at the start of a row of symbols. Thus, in response to the inputs from the respective line buffers, PCG2 430 generates the third line of each symbol in a row on the odd horizontal scans and the fourth line of each symbol in a row on the even horizontal scans, PCG3 440 generates the fifth line of each symbol in a row on the odd horizontal scans and the sixth line of each symbol in a row on the even horizontal scans, PCG4 450 generates the seventh line of each symbol in a row on the odd horizontal scans and the eight line of each symbol in a row on the even horizontal scans and the PCG5 460 generates the ninth line of each symbol in a row on the odd horizontal scans and the tenth line of each symbol in a row on the even horizontal scans.

It is clear that this apparatus could be extended to accommodate larger character sizes or reduced to accommodate smaller character sizes by adding or deleting line buffers and segment generators.

Timing and control circuitry 600 controls the gating of each of the four groups of information signals from the line buffers to the segment generators along lines 208 and also controls the timing of the output signals from the read-only storage elements 240 to multiplex video generator 500.

The outputs from character generator 400 present a parallel signal which contains the video information. Timing and control unit 600 also provides control signals and timing signals along lines 604 to multiplex video generator 500. Multiplex video generator 500 transmits the video signals to the appropriate display terminal for visual display.

Referring now to FIGS. 1, 2, 3, and 11, the generation of representative symbols will be explained.

If for example, as shown in FIG. 2, it is desired to generate the symbol upper case A in the first symbol position in the first row of symbols on each of the first eight display devices, and the symbol upper case B in the second symbol position on the first row of symbols in each of the first display devices, the apparatus embodying the invention would operate in the following manner.

A group of information signals in parallel byte form representing the symbol A is transmitted from CPU 50 to terminal control 200 and stored in core storage 302. Assuming each of these information bytes takes the binary form 000001, which is the binary representation for the symbol A. At the appropriate instant of time, in synchronism with the raster scan for the display devices, the information byte representing the symbol A for the first row of symbols of the first display device is gated to the sequential line buffers (FIG. 4).

The binary representation 000001 acts as an address for a particular group of storage elements in segment generator 410 which have stored therein the video representation for the first line of the symbol A.

In eight-bit binary form, the video representation for the first line of the symbol A is 00011000. This binary information is also represented in hexadecimal notation as "18."

The eight-bit binary representation is transmitted on lines 428 to P/S converter 505 (FIG. 6, 6A).

P/S converter 505 serializes the eight-bit video representation and presents this serial representation along line 511 to multiplex video generator gates 552 (FIG. 10).

Since this example deals only with the data generated for the first eight display devices 101 through 108, the other outputs 521, 531 and 541 of converter 505 will not be explained in detail. These outputs represent the video signals for display devices 109 through 116, 117 through 124 and 125 through 132 respectively.

Due to the speed of operation of the core storage 302 and the segment generators 410 through 460, it is possible to operate four groups of signals in parallel through a single set of line buffers and a single segmented character generator.

Referring now to (FIGS. 6 & 10), the output line 511 which transmits the video signals for the first segment of each symbol to be displayed on display devices 101 through 108, multiplex gate 552 is turned on by signal LC1 on line 641 during line 1 of each row of symbols on odd horizontal scans and line 2 the first line of each row of symbols on even horizontal scans. The video being presented on line 511 at the time of the first line of an odd horizontal scan is hexadecimal "18," which is transmitted to sync mixer 564 (FIG. 10) through OR-circuit 562.

In sync mixer 564 synchronization signals are added to the video signals to form a composite video signal for transmission to display terminal 101. The sync signal vertical sync 1 represents a set of scanning synchronization signals which cause the raster on display devices 101, 109, 117, 125 to begin one horizontal scanning line time in advance of the beginning of the raster scan, for display devices 102, 110, 118, and 126, which is in synchronism with sync signal vertical sync 2.

This "staggering" of the synchronization signals, and therefore of the raster scan of the groups of display devices, allows the visual image presented by each display device to begin at the same relative location on the face of each display device.

If the synchronization signals were not "staggered" the visual impression obtained on viewing eight display devices side-by-side would be that each row of characters in the second and subsequent displays would be displaced vertically down two horizontal lines from the preceding display device. This would result in an effect similar to that shown in FIG. 1 if the first symbol from each display device were placed side by side on a single composite display device.

In a similar manner as described above, one horizontal line time after the information byte has passed through line buffer 320, the binary representation 000001 is presented to segment generator 430 which then in response to this input address signal and ODD/EVEN Flip-Flop 417 in ODD state, generates the binary representation 011111110 which represents line 3 of the symbol A. At the same time, the information signal representative of the first symbol on display device 102 is presented to segment generator 410.

For simplicity of explanation, the symbol A will be generated also as the first symbol in the first line of symbols on display device 102.

In a similar manner to that described above, the video signal from segment generator 430 (FIG. 4) is serialized and presented to gate 554 (FIG. 10) which is turned on by LC2 during the second line of each row of symbols in each horizontal scan. Thus, the video representation 01111110 is transmitted to display device 101 in proper time sequence.

Figure 1:
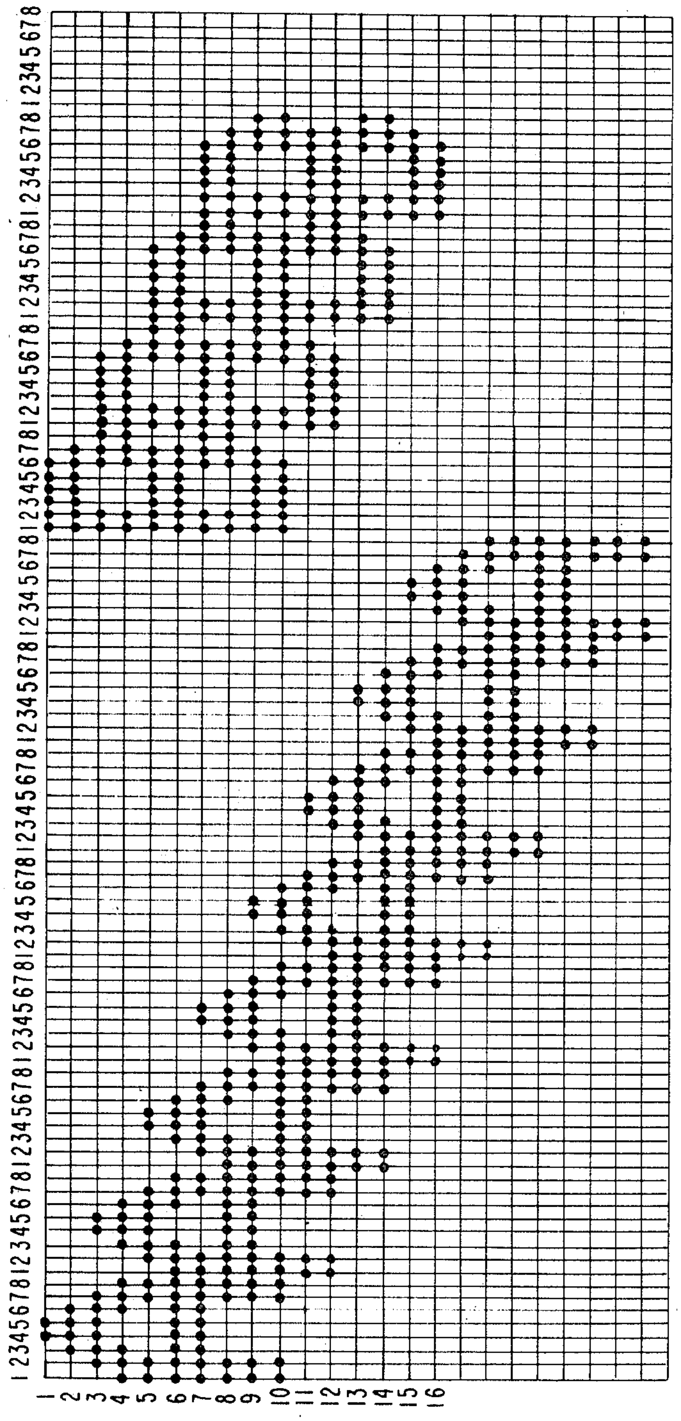
FIG. 1 is a graphical illustration of the formation of individual symbol patterns for a group of eight display terminals.

As can be seen from FIG. 1, the data representing the first line of the first row of symbols for the display device 102 is similarly presented to the display device at the same time. However, the gating for display terminal 102 is not shown since the chart of FIG. 9 sets out the appropriate gating conditions for each of the display terminals for each line count and segment generator.

In like manner, one horizontal line time later the information signal, representing upper case A, is presented to segment generator 440 (FIG. 4) which responds by generating video representation 11000011 which corresponds to the fifth line of the symbol A. At the same time, line 3 of the first symbol on display device 102 is being generated and line 1 of the first symbol for display device 103 is being generated.

In like manner, line 7 and 9 of the first symbol in the first row of symbols for display device 101 is generated on the first odd horizontal scan. The video representation for line 7 being 11111111 and for line 9 being 11000011.

At the time line 7 is being generated on display device 101, line 5 is being generated for display device 102, line 3 is being generated for display device 103 and line 1 is being generated for display device 104. It may be noted at this point, that when the first symbol to be generated on each display is being displayed, the segment generators 410, 430, 440, 450 and 460 (FIG. 4) are operated in a staggered manner as shown in FIG. 11, with segment generator 460 not active to generate line 9 for the first display device 101 until PCG1 segment generator 410 is generating the first line of the first symbol for display device 105.

In the manner described above, the first line of the first symbol to be displayed on each of the display devices 101 through 108 is generated in the first eight multiplexed symbol positions. In the ninth symbol position, the first scan line of the first symbol in the second row of symbols on display device 101 can be generated since segment generator 410 is free. In like manner, one horizontal line time later the third line of the first symbol in the second row to be generated on the first display device 101 is generated while the first scan line of the first symbol in the second row to be generated on display device 102 is generated. Similarly, the second and further symbols on each row of symbols for each display device are generated in the staggered manner described above.

Referring to FIGS. 9 and 10, the multiplexing of the video representations to form the visual images on display device 120 is shown.

Display device 120 is contained in the third group of eight multiplexed video display devices. It can be seen that the video signals representing the video to be displayed on display device 120 are represented in each case by PCG1GR3 on line 531, PCG2GR3 on line 532, PCG3GR3 on line 533, PCG4GR3 on line 534 and PCG5GR3 on line 535.

Since display device 120 is the fourth unit in the third group, the staggered synchronization signals are the same as for display device 104.

Thus, the first line of video for each symbol to be generated on display device 120 is gated by signal LC4 along line 644. This means that while the fourth segment (lines 7 on odd or 8 on even scans) of each symbol on display device 101 is being generated, the first segment (lines 1 on odd or 2 on even scans) of each symbol on display device 120 is being generated. In like manner, the second segment is generated at LC5 time, the third segment is generated at LC6 time, the fourth segment is generated at LC7 time and the fifth segment is generated at LC8 time.

The video signals are mixed in sync mixer 584 with vertical sync 4 to allow the visual image presented to begin at the same relative location on the display device as each of the other display devices.

The particular font of characters employed requires eight spots in the horizontal direction and 10 lines in the vertical direction with an additional six vertical lines providing the space between rows of symbols and two spots providing the horizontal space between characters in each row. This format, of course, is completely flexible and the invention as described could be used with any symbol format.

While the operation of the invention has been primarily described for an odd horizontal field, operation on the even horizontal field would be identical with line counts 1 through 8 representing horizontal lines 2, 4, 6, 8, 10, 12, 14 and 16 respectively, rather than lines 1, 3, 5, 7, 9, 11, 13 and 15 for each row of symbols.

While the invention has been particular shown and described with reference to the preferred embodiments thereof, it will be understood by those skilled in the art that various changes in form and details may be made therein without departing from the spirit and scope of the invention.

What is claimed is:

1. Apparatus for multiplexing a segmented character generator to generate a complete frame of symbols for a plurality of display devices, comprising:

a plurality of segment generators equal in number to the number of lines required to form a symbol, divided by the number of fields per frame of information displayed wherein each of said segment generators simultaneously generates a segment of a plurality of symbols to be displayed on a plurality of display devices;

a plurality of sequential line buffer registers for storing coded information signals representative of symbols to be displayed on said plurality of display devices; and gating means for gating the outputs of each of said plurality of segment generators simultaneously to different display devices at the correct time interval.

2. Apparatus according to claim 1 for multiplexing a symbol generator, wherein each symbol requires eight horizontal spaces and 10 vertical lines with six vertical lines reserved for interrow spacing, comprising four line buffer registers connected respectfully to a segmented symbol generator comprising five segment generators to generate 1,920 symbols for each of 32 display devices.

3. A method of multiplexing a segmented symbol generator for generating all symbols to be displayed on a plurality of display devices comprising the steps of:

a. applying simultaneously a plurality of input signals to each of a plurality of segment generators;

b. simultaneously generating a plurality of symbol segments for a plurality of different display devices in response to said plurality of input signals;

c. simultaneously gating said generated symbol information to a plurality of different display devices in proper time sequence to display a plurality of symbols on a plurality of display devices.

4. A method of multiplexing a segmented symbol generator as in claim 3 wherein said generating step further comprises generating simultaneously four symbol segments for four symbols for four different display devices.

5. A method of multiplexing a segmented symbol generator comprising the steps of:

a. transmitting a Kth information signal representing a Pth symbol to be displayed to a first segment generator at a first time;

b. generating a first segment of said Pth symbol in response to said Kth information signal said first segment to be displayed on a Qth output device;

c. transmitting said Kth information signal representing said Pth symbol to be displayed to a second segment generator and transmitting a K+1th information signal representing a P+1th symbol to be displayed to said first segment generator at a second time;

d. generating a second segment of said Pth symbol in response to said Kth information signal, and generating a first segment of said P+1th symbol in response to said K+1th information signal, said second segment of said Pth symbol to be displayed on said Qth output device and said first segment of said P+1th symbol to be displayed on a Q+1th output device;

e. transmitting said Kth information signal representing a Pth symbol to be displayed to a third segment generator, said K+1th information signal representing said P+1th symbol to be displayed to said second segment generator, and a K+2th information signal representing a P+2th symbol to be displayed to said first segment generator at a third time;

f. generating a third segment of said Pth symbol in response to said Kth information signal, a second segment of said P+1th symbol in response to said K+1th information signal, and a first segment of said P+2th symbol in response to said K+2th information signal, said third segment of said Pth symbol to be displayed on said Qth output device, said second segment of said P+1th symbol to be displayed on said Q+1th output device, and said first segment of said P+2th symbol to be displayed on a Q+2th output device;

g. transmitting said Kth information signal representing a Pth symbol to be displayed to a fourth segment generator, said K+1th information signal representing said P+1th symbol to be displayed to said third segment generator, said K+2th information signal representing said P+2th symbol to be displayed to second segment generator, and a K+3th information signal representing a P+3th symbol to be displayed to said first segment generator at a fourth time;

h. generating a fourth segment of said Pth symbol in response to said Kth information signal, a third segment of said P+1th symbol in response to said K+1th information signal, a second segment of said P+2th symbol in response to said K+2th information signal, and a first segment of said P+3th symbol in response to said K+3th information signal, said fourth segment of said Pth symbol to be displayed on said Qth output device, said third segment of said P+1th symbol to be displayed on said Q+2th output device, said second segment of said P+2th symbol to be displayed on said Q+2th output device, and said first segment of said P+3th symbol to be displayed on a Q+3th output device;

i. transmitting said Kth information signal representing a Pth symbol to be displayed to a fifth segment generator, said K+1th information signal representing a P+1th symbol to be displayed to said fourth segment generator, said K+2th information signal representing said P+2th symbol to be displayed to said third segment generator, said K+3th information signal representing said P+3th symbol to be displayed to said second segment generator, and a K+4th information signal representing a P+4th symbol to be displayed to said first segment generator at a fifth time;

j. generating a fifth segment of said Pth symbol in response to said Kth information signal, a fourth segment of said P+1th symbol in response to said K+1th information signal, a third segment of said P+2th symbol in response to said K+2th information signal, a second segment of said P+3th symbol in response to said K+3th information signal, and a first segment of said P+4th symbol in response to said K+4th information signal, said fifth segment of said Pth symbol to be displayed on said Qth output device, said fourth segment of said P+1th symbol to be displayed on said Q+1th output device, said third segment of said P+2th symbol to be displayed on said Q+2th output device, said second segment of said P+3th symbol to be displayed on said Q+3th output device, and said first segment of said P+4th symbol to be displayed on a Q+4th output device;

k. repeating said steps of transmitting and generating until all segments of all symbols on Q output devices have been displayed.

* * * * *

UNITED STATES PATENT OFFICE
CERTIFICATE OF CORRECTION

Patent No. 3,641,558 Dated February 8, 1972

Inventor(s) William C. Cook, et al.

It is certified that error appears in the above-identified patent and that said Letters Patent are hereby corrected as shown below:

Column 1, line 39 the equation "N M S/F" should read --$N=\frac{M-S}{F}$--.

Signed and sealed this 1st day of May 1973.

(SEAL)
Attest:

EDWARD M.FLETCHER,JR.
Attesting Officer

ROBERT GOTTSCHALK
Commissioner of Patents